E. S. BROWER.
WIND SHIELD.
APPLICATION FILED APR. 19, 1912.
1,109,197.
Patented Sept. 1, 1914.
2 SHEETS—SHEET 1.
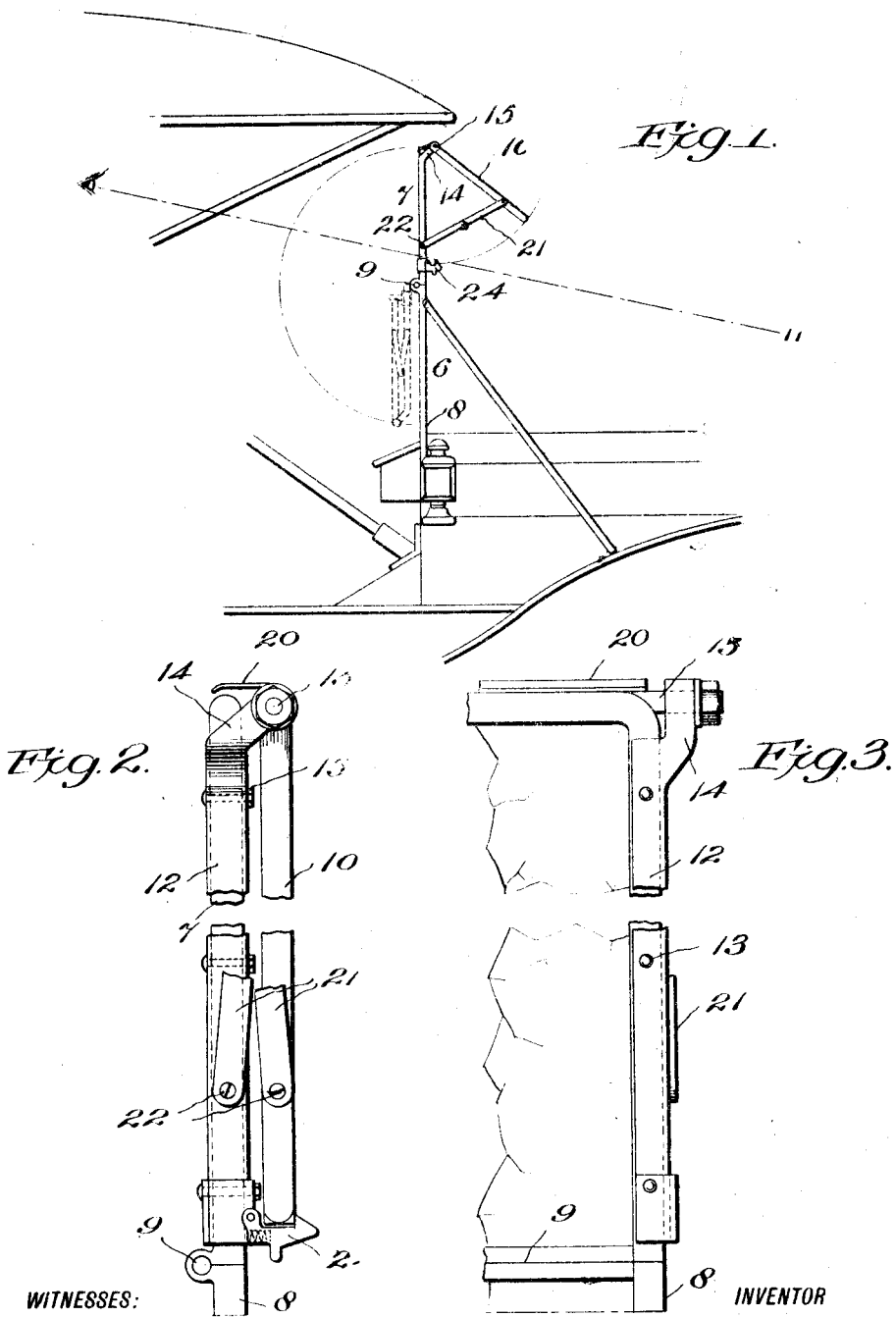
WITNESSES:
INVENTOR
Edward S. Brower
BY
Brock Becker & Anth
ATTORNEYS.

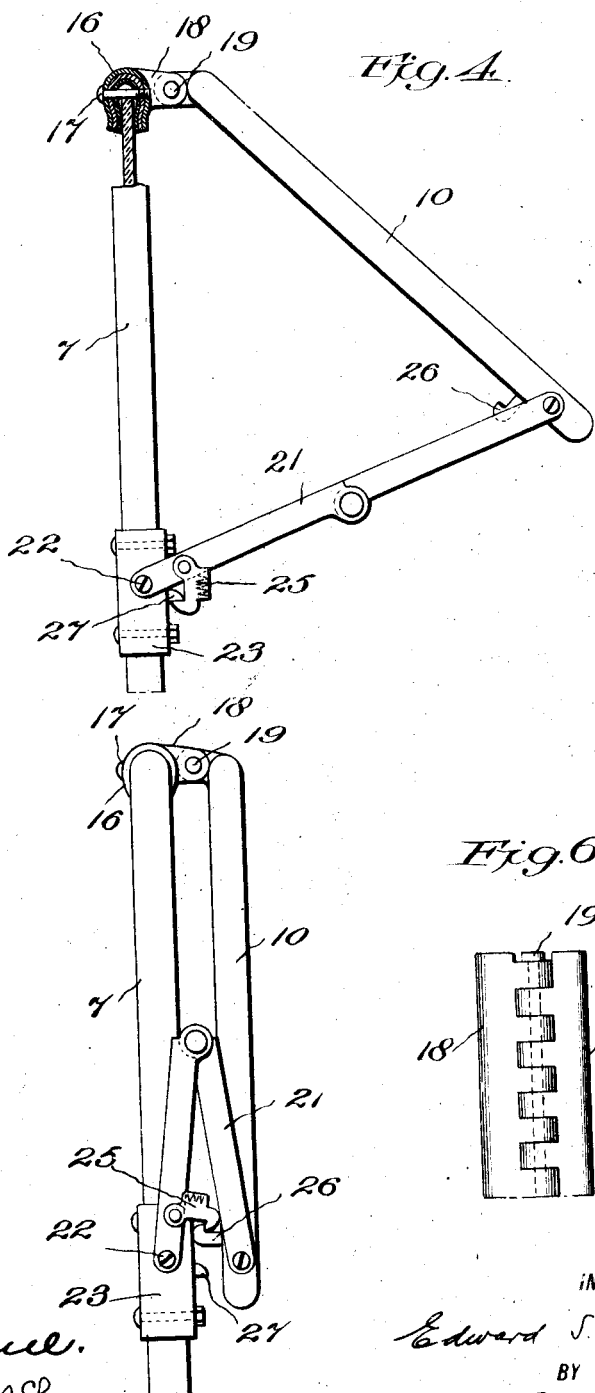

UNITED STATES PATENT OFFICE.

EDWARD S. BROWER, OF RIDGEWOOD, NEW JERSEY.

WIND-SHIELD.

1,109,197.     Specification of Letters Patent.     Patented Sept. 1, 1914.

Application filed April 19, 1912. Serial No. 691,891.

*To all whom it may concern:*

Be it known that I, EDWARD S. BROWER, a citizen of the United States, and a resident of Ridgewood, in the county of Bergen and State of New Jersey, have invented certain new and useful Improvements in Wind-Shields, of which the following is a specification.

The invention, although of more or less general application, relates in particular to the wind shields of automobiles and like vehicles. The wind shields in common use are either wholly transparent, or have an upper transparent portion through which vision is had. In rainy and stormy weather, rain or snow will drive directly against a wind shield of this sort, thereby obscuring more or less the visual portion of the shield and greatly interfering with the driving of the vehicle.

It is the object of my invention to protect the visual portion of the wind shield from rain, snow and the other elements.

Accordingly my invention consists in providing a rain guard, so-called, which shall overhang the visual portion of the wind shield more or less and which is disposed on a forwardly and downwardly inclined slant so as to shed the rain or snow, etc., and prevent the same from coming in contact with the visual portion of the shield. Preferably this rain guard is hingedly supported so that it may be folded down when not in use and in order that it shall not interfere with the vision when so folded it is preferably made of transparent material.

Various other features of the invention will appear as the specification proceeds.

I have illustrated in the accompanying drawings several preferred embodiments of the invention, but changes such as come within the scope of the appended claims may be made without departing from the spirit and scope of the invention.

In the drawings: Figure 1 is a side elevation showing the application of the invention to the wind shield of an automobile. Figs. 2 and 3 are broken detail views taken on an enlarged scale, the first being a rear and the second being an end elevation of the rain guard and its attaching means. Figs. 4 and 5 are end views of a slightly modified form of the invention—the rain guard being shown in both the folded and the extended positions. Fig. 6 is a broken detail view of the hinge construction employed in Figs. 4 and 5.

Like reference characters have been used throughout the several views as referring to the same parts.

Referring first to the form of the invention shown in the first three figures, 6 designates an ordinary wind shield, the upper section 7 of which is transparent to provide a visual portion. The lower section 8, may or may not be transparent, and the two sections are usually jointed together by a hinge 9, which will permit of the upper section being folded down when desired, substantially as shown in the dotted lines, Fig. 1.

The "rain guard," as I have termed it, consists of a panel 10, suitably connected at the top to the wind shield and projecting forwardly and downwardly an an angle in such fashion as to shed the rain and snow and prevent it from coming against the visual portion of the shield. For this purpose the rain guard extends down far enough to substantially overhang the visual portion of the shield. By reason of this arrangement the rain, snow, etc., instead of striking directly against the visual portion of the wind shield and thereby obscuring the same, will fall upon the rain guard and be deflected away from the shield. The whole of the wind shield beneath the rain guard is thus kept clear and unobstructed, and as the line of vision, denoted 11, extends through this clear field, it will be evident that rain, snow, etc., will not interfere with the usual functions of the wind shield.

In order that the rain guard may be folded down out of the way when not in use, it is preferably hinged at the top so that when not needed, it may be swung down into the position shown in Fig. 2. In order also that when in such folded position the rain guard shall not interfere with the vision, the body of the guard is preferably made of transparent material, such as glass.

The rain guard may be supported in various ways. Preferably the support is such that the device may be readily attached to any of the usual forms of wind shields. For this purpose a bracket, arranged for attachment to a wind shield, is usually employed, and this bracket forms the support for the rain guard. The bracket is secured to the wind shield in any suitable fashion. For instance in the form shown in the first three figures, the supporting bracket consists of two side members 12 secured to the sides of the wind shield by bolts 13 or other suitable fastenings, and having forwardly offset upper ends 14 which carry the hinge pintle 15, on which the rain guard is engaged. In the form shown in Figs. 4 and 5 the supporting bracket consists of a member 16 engaged over the top of the wind shield and secured thereto by fastenings 17, this member having a forwardly extending portion 18, which carries the hinge pintle 19, from which the rain guard is suspended. In this latter form the hinge joint between the top of the wind shield and the rain guard is preferably made continuous, as indicated in Fig. 6, to prevent the entrance of moisture at the top between the wind shield and the guard. To close the space at the top between the shield and the guard in the first form of the invention, there is preferably provided a drip guard 20, which may be carried by the upper edge of the rain guard so as to project rearwardly over the top of the wind shield.

For the purpose of holding the rain guard in its extended or open position, foldable braces 21 are preferably provided, the same in a preferred form consisting simply of the hinged links, as shown, which are connected between the wind shield and the guard. These braces may make connection direct with the wind shield, but in the first form, the pivots 22 for the inner ends of the links are preferably carried by the side members, as shown in Figs. 2 and 3, while in the second form, shown in Figs. 4 and 5, the pivots for the links may be carried by special brackets 23 secured to the sides of the wind shield.

To prevent the parts from rattling and also to prevent the parts from unfolding or opening out, in case the upper section of the wind shield is folded down into the dotted line position in Fig. 1, means are preferably provided for securing the guard in its lowered position. This means may take the form of a simple spring catch which, as shown at 24 in Fig. 2, engages with the lower edge of the rain guard to hold it in lowered position.

In Figs. 4 and 5 I have illustrated a form of securing means for holding the rain guard in either the extended or the folded position, the same consisting of a hook member 25 carried by one of the hinged links, which in the lowered or folded position of the guard engages with a complementary locking member 26 on the under side of the guard (Fig. 4) and which in the open position of the guard engages with a locking member 27 (Fig. 5) on the wind shield or on the bracket carried by the wind shield.

What is claimed, is:

1. In combination with a vehicle wind shield having an upper transparent portion, a bracket secured to the wind shield, a rain guard hinged to the bracket, brace devices to support said rain guard in operative position, a locking member carried by the braces, and members carried by the wind shield and the rain guard respectively, arranged to be engaged by the locking member on the braces to lock the braces in open position with the rain guard extended, or to lock the braces in folded position with the rain guard lowered.

2. In combination with a vehicle wind shield having an upper transparent portion, a forwardly extending bracket resting on the top of the wind shield and secured thereto, a transparent rain guard hinged at its upper edge to the forwardly extending portion of the bracket, hinged braces connected between the sides of the wind shield and the rain guard, a locking member carried by the hinged braces, and members carried by the wind shield and the rain guard respectively, arranged to be engaged by the locking member on the braces to lock the braces in open position with the rain guard extended, or to lock the braces in folded position with the rain guard lowered.

Signed at New York city, in the county of New York and State of New York, this 10th day of April A. D. 1912.

EDWARD S. BROWER.

Witnesses:
LOUISA E. SIMSON,
PHILIP S. McLEAN.